March 29, 1949.  F. ROSENTHAL  2,465,486
PREPARATION OF 4,4'-DIVINYL-BIPHENYL
Filed Nov. 24, 1945
PREPARATION OF
4,4'-DIVINYL-BIPHENYL
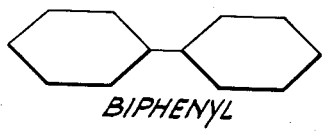
BIPHENYL
ACETYL CHLORIDE
ALUMINUM CHLORIDE
↓
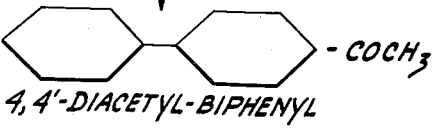
4,4'-DIACETYL-BIPHENYL
ALUMINUM
ISOPROPOXIDE
↓
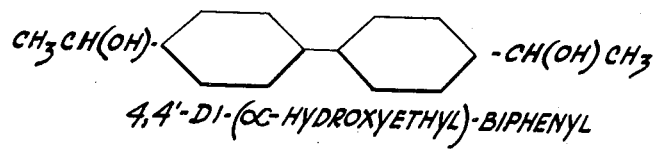
4,4'-DI-(α-HYDROXYETHYL)-BIPHENYL
ALUMINA
↓
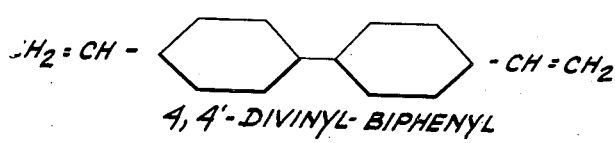
4,4'-DIVINYL-BIPHENYL
INVENTOR.
Fritz Rosenthal
BY
ATTORNEY

UNITED STATES PATENT OFFICE 2,465,486

PREPARATION OF 4,4'-DIVINYL-BIPHENYL

Fritz Rosenthal, Crescent Park, Bellmawr, N. J., assignor to Radio Corporation of America, a corporation of Delaware Application November 24, 1945, Serial No. 630,683

7 Claims. (Cl. 260—669)

This invention relates to a new method of preparing a divinyl compound having many useful properties.

It has been heretofore thought that the compound 4,4'-divinyl-biphenyl could not successfully be prepared in the pure state and in monomeric form. It has been regarded as an extremely unstable substance which polymerizes rapidly during attempts to distill it. For this reason previous attempts to prepare the pure monomer have always ended in failure. The present invention presents a method which overcomes the difficulties previously encountered.

It is an object of the invention to provide an improved method of preparing 4,4'-divinyl-biphenyl.

It is a further object of the invention to provide an improved method of preparing 4,4'-divinyl-biphenyl using a polymerization inhibitor.

It is also an object of the invention to provide an improved method of preparing 4,4'-divinyl-biphenyl using an inert gas to sweep the reaction product from the zone of reaction to the cooling zone.

In general, the method of preparation is as follows:

As shown in the accompanying figure, biphenyl is first acetylated to 4,4'-diacetyl-biphenyl. This reaction is well known in the art. Acetyl chloride in the presence of aluminum chloride is used as the acetylizing agent. Next, the 4,4'-diacetyl-biphenyl is reduced to 4,4'-di-(α-hydroxyethyl)-biphenyl with the aid of aluminum isopropoxide. This step is also old.

The third and final step, however, has never been successfully accomplished heretofore so far as the inventor is aware. In this step the 4,4'-di-(α-hydroxyethyl)-biphenyl is dehydrated to 4,4'-divinyl-biphenyl using a dehydrating agent. The reaction is carried out, preferably in an atmosphere of inert gas, at reduced pressure and elevated temperature. The 4,4'-divinyl-biphenyl is in gaseous form and has a great tendency to polymerize. It is carried into a cooling zone with the aid of an inert gas and collected as a solid on a chilled surface.

Example 1

4,4'-di-(α-hydroxyethyl)-biphenyl, was prepared as indicated above. Then 12 gms. of the di-(α-hydroxyethyl)-biphenyl and .12 gm. of hydroquinone were heated on an oil bath to 180° C. The hydroquinone was present as a polymerization inhibitor. After the di-(α-hydroxyethyl)-biphenyl was melted the flask was filled with 21 g. activated alumina. The flask was then heated on an oil bath at 280° C. for 20 minutes under high vacuum. At this temperature the 4,4'-divinyl-biphenyl distilled off in gaseous form and was collected as a solid on the chilled walls of a closely adjacent water-cooled tube connected to the distilling flask. The water may be of any temperature from just above freezing to about room temperature although its efficiency as a condensing agent drops as its temperature rises. The path between the distilling chamber and the cooling zone must be made very short otherwise polymerization will occur. In order to inhibit polymerization it is much preferred to use a vacuum distillation process. This allows lower temperature to be used and more rapid evolution of the gaseous product is obtained. In general, the higher the vacuum the higher the yield. The yield obtained in this case was 38 percent. The product was easily soluble in acetone and in styrene and had a melting point of 152° C.

Example 2

As in Example 1, a flask was charged with di-(α-hydroxyethyl)-biphenyl and hydroquinone, again in a 100 to 1 ratio and after the di-(α-hydroxyethyl)-biphenyl was melted the flask was filled with activated alumina as before. This time the distillation was carried out in an atmosphere of nitrogen gas under a pressure of about 10 mm. of mercury and the flask was heated to a temperature of 285° C. for 10 minutes. A stream of nitrogen gas was also used to sweep the gaseous distillate from the reaction chamber to the cooling zone. This time the yield of 4,4'-divinyl-biphenyl was 47 percent.

Polymerization inhibitors other than hydroquinone may be used, other examples being sulfur, benzoquinone, cresol, and pyrogallol. It is also possible to obtain results using no inhibitor, and other inert gases such as argon or helium may be utilized.

Although activated alumina was the preferred dehydrating agent mentioned in the examples, it is obvious that there are many other suitable substances which can be used. Among these are anhydrous zinc chloride, anhydrous potassium hydroxide, thorium oxide, and tungsten oxide.

The product is a new substance that has many useful properties. In monomeric form it may be added to other monomers such as styrene and copolymers may be formed. In this case the 4,4'-divinyl-biphenyl acts as a cross-linking agent. The preparation of these copolymers is the subject of a co-pending application, Serial No.

630,684, filed November 24, 1945, now U. S. Patent No. 2,462,555. It is also possible to copolymerize the material with other vinyl type resins and many other resins in general having unsaturated linkages.

I claim as my invention:

1. In a method of preparing the compound 4,4'-divinyl-biphenyl, the steps which include distilling di-(α-hydroxyethyl)-biphenyl in the presence of a dehydrating agent and immediately chilling the gaseous distillate to convert it to the solid state.

2. In a method of preparing the compound 4,4'-divinyl-biphenyl, the steps which include vacuum distilling di-(α-hydroxyethyl)-biphenyl in the presence of a polymerization inhibitor and a dehydrating agent and immediately chilling the gaseous distillate to convert it to the solid state.

3. In a method of preparing the compound 4,4'-divinyl-biphenyl, the steps which include vacuum distilling di-(α-hydroxyethyl)-biphenyl in the presence of hydroquinone and a dehydrating agent and immediately chilling the gaseous distillate to convert it to the solid state.

4. In a method of preparing the compound 4,4'-divinyl-biphenyl, the steps which include distilling di-(α-hydroxyethyl)-biphenyl in the presence of hydroquinone and activated alumina and immediately chilling the gaseous distillate to convert it to the solid state.

5. In a method of preparing the compound 4,4'-divinyl-biphenyl, the steps which include distilling di-(α-hydroxyethyl)-biphenyl in the presence of a dehydrating agent and in an inert gaseous atmosphere, sweeping the gaseous reaction product into a cooling zone by means of said inert gas and immediately chilling said reaction product to convert it to solid form.

6. In a method of preparing the compound 4,4'-divinyl-biphenyl, the steps which include distilling di-(α-hydroxyethyl)-biphenyl in the presence of a dehydrating agent and a polymerization inhibitor, said distillation reaction taking place in an inert gaseous atmosphere under reduced pressure, sweeping the gaseous reaction products into a cooling zone by means of said inert gas and immediately chilling said reaction product to convert it to solid form.

7. In a method of preparing the compound 4,4'-divinyl-biphenyl, the steps which include distilling di-(α-hydroxyethyl)-biphenyl at a temperature of about 280° C. in the presence of a dehydrating agent and a polymerization inhibitor, said distillation reaction taking place in an inert gaseous atmosphere under reduced pressure, sweeping the gaseous reaction products into a cooling zone by means of said inert gas and immediately chilling said reaction products.

FRITZ ROSENTHAL.

REFERENCES CITED

The following references are of record in the file of this patent:

UNITED STATES PATENTS

| Number | Name | Date |
|---|---|---|
| 1,772,895 | Humphrey | Aug. 12, 1930 |
| 1,870,852 | Jargstoff | Aug. 9, 1932 |
| 2,166,125 | Britton et al. | July 18, 1939 |
| 2,181,102 | Stoesser et al. | Nov. 21, 1939 |
| 2,345,625 | Palmer et al. | Apr. 4, 1944 |
| 2,390,368 | Hochwalt | Dec. 4, 1945 |

FOREIGN PATENTS

| Number | Country | Date |
|---|---|---|
| 481,725 | Great Britain | Mar. 10, 1938 |

OTHER REFERENCES

Valyie et al.: Jour. Physical Chem., vol. 49, 461–3 (1945).

Heilbron: Dict. of Organic Compounds, vol. II, Oxford Univ. Press, N. Y. (1943), page 785.